United States Patent
Deng et al.

(10) Patent No.: US 10,109,839 B2
(45) Date of Patent: Oct. 23, 2018

(54) ELECTRODE TERMINAL, COVER ASSEMBLY AND BATTERY

(71) Applicants: SHENZHEN BYD AUTO R&D COMPANY LIMITED, Shenzhen (CN); BYD COMPANY LIMITED, Shenzhen, Guangdong (CN)

(72) Inventors: Qisi Deng, Guangdong (CN); Lujian Wang, Guangdong (CN); Yuchen He, Guangdong (CN); Qiang Wu, Guangdong (CN)

(73) Assignees: Shenzhen BYD Auto R&D Company Limited, Shenzhen, Guangdong; BYD Company Limited, Shenzhen, Guangdong ( * ) Notice: Subject to any disclaimer, the term of this patent is extended or adjusted under 35 U.S.C. 154(b) by 224 days.

(21) Appl. No.: 14/134,984

(22) Filed: Dec. 19, 2013

(65) Prior Publication Data
US 2014/0106209 A1   Apr. 17, 2014

Related U.S. Application Data

(63) Continuation of application No. PCT/CN2012/077670, filed on Jun. 27, 2012.

(30) Foreign Application Priority Data

Jun. 28, 2011  (CN) .......................... 2011 1 0175937
Apr. 20, 2012  (CN) .......................... 2012 1 0117704

(51) Int. Cl.
H01M 2/02      (2006.01)
H01M 2/30      (2006.01)
(Continued)

(52) U.S. Cl.
CPC ............. *H01M 2/30* (2013.01); *H01M 2/024* (2013.01); *H01M 2/065* (2013.01); *H01M 2/08* (2013.01); *H01M 2/305* (2013.01)

(58) Field of Classification Search
CPC ........ H01M 2/30; H01M 2/024; H01M 2/065; H01M 2/08; H01M 2/305
See application file for complete search history.

(56) References Cited

U.S. PATENT DOCUMENTS 5,856,041 A * 1/1999 Inoue ..................... H01M 2/06
                                                            429/182
6,103,418 A   8/2000 Sato et al.
(Continued)

FOREIGN PATENT DOCUMENTS

CN      1716657 A    1/2006
CN    102386368 A    3/2012
(Continued)

OTHER PUBLICATIONS

PCT International Preliminary Report on Patentability dated Jan. 7, 2014, issued in International Application No. PCT/CN2012/077670 (5 pages).
(Continued)

*Primary Examiner* — Raymond Alejandro
(74) *Attorney, Agent, or Firm* — Finnegan, Henderson, Farabow, Garrett & Dunner, LLP

(57) ABSTRACT

An electrode terminal, a cover assembly and a battery comprising the cover assembly are provided. The electrode terminal comprises: a terminal pole portion, and a pole cap portion formed on an end of the terminal pole portion, and a buffering structure disposed on a surface of the pole cap portion facing to the terminal pole portion.

9 Claims, 4 Drawing Sheets

(51) Int. Cl.
*H01M 2/06* (2006.01)
*H01M 2/08* (2006.01)

(56) References Cited

U.S. PATENT DOCUMENTS

2007/0275301 A1  11/2007  Asahina et al.
2009/0061307 A1   3/2009  Uh

FOREIGN PATENT DOCUMENTS

| JP | S 58-71557 A | 4/1983 |
| JP | H 9-115500 A | 5/1997 |
| JP | 2003-45406 A | 2/2003 |
| JP | 2003-86151 A | 3/2003 |
| JP | 2003-173767 A | 6/2003 |
| JP | 2003-263975 A | 9/2003 |
| WO | WO2013/000415 A1 | 1/2013 |

OTHER PUBLICATIONS

PCT International Search Report dated Oct. 4, 2012, issued in International Application No. PCT/CN2012/077670 (3 pages).

* cited by examiner

ELECTRODE TERMINAL, COVER ASSEMBLY AND BATTERY

CROSS-REFERENCE TO RELATED APPLICATIONS

This application is a continuation application of International Application No. PCT/CN2012/077670, filed on Jun. 27, 2012, which claims priority to and benefits of the following applications:
1) Chinese Patent Application Serial No. 201110175937.9, filed with the State Intellectual Property Office of P. R. China on Jun. 28, 2011; and
2) Chinese Patent Application Serial No. 201210117704.8, filed with the State Intellectual Property Office of P. R. China on Apr. 20, 2012.

The entire contents of the above applications are incorporated herein by reference.

FIELD

The present disclosure relates to a battery field, and more particularly to an electrode terminal, a cover assembly and a battery having the cover assembly.

BACKGROUND

A lithium ion battery is an ideal power source for a modern vehicle because of the advantages of non-pollution, low cost, high capacity, long cycle of life, etc. The lithium ion battery is typically formed by winding or stacking a positive plate, a separator and a negative plate sequentially to form an electric core, placing the electric core in a chamber formed by a battery shell and a cover plate, injecting an electrolyte in the chamber, and sealing an opening end of the battery shell, followed by formation. In the lithium ion battery, whether the sealing by the cover plate is good may affect battery safety, aging resistance and insulating performance of the lithium ion battery. In addition, the cover plate accounts for a certain proportion of the total cost of the lithium ion battery. Production efficiency and improvement of yield of the cover plate may help reduce the cost of the battery.

Currently, the sealing and insulation of the lithium ion battery are mainly realized by injection molding a plastic. Meanwhile, a ceramic sealing member may be used for insulating and sealing the cover plate. However, ceramic is difficult to weld and easy to break or crack, so the ceramic is only restricted to be used as a ceramic gasket. And other conventional sealing members, such as a plastic sealing member, may still be required for the sealing between the cover plate and an electrode terminal. When a ceramic sealing member is used for insulating and sealing between the cover plate and the electrode terminal, due to material differences, large stress produced during the welding process may break or crack the ceramic sealing member, and thus decrease the reliability and stability of the battery, reducing safety of the lithium ion battery, increasing manufacturing difficulty, reducing battery yield, and affecting practical applications and development of the battery.

SUMMARY

Embodiments of the present disclosure seek to solve at least one of the problems existing in the art to at least some extent. Accordingly, an electrode terminal may need to be provided, which may increase battery yield and improve battery safety.

Moreover, a cover assembly may need to be provided, which is easy to manufacture on a large scale. During manufacturing, the cover assembly may not break and crack, and the yield of the cover assembly is high.

Further, a battery having the cover assembly may need to be provided, which may have excellent aging resistance, prolonged lifespan and enhanced safety.

According to a first aspect of the present disclosure, an electrode terminal may be provided. The electrode terminal may comprise: a terminal pole portion; and a pole cap portion formed on an end of the terminal pole portion, in which a buffering structure is disposed on a surface of the pole cap portion facing to the terminal pole portion.

According to a second aspect of the present disclosure, a cover assembly may be provided. The cover assembly may comprise: a cover plate body formed with a via hole penetrating therethrough; an insulation sealing member fixedly received in the via hole; and the electrode terminal, in which the terminal pole portion of the electrode terminal penetrates through the via hole for leading out a current, the insulation sealing member is sandwiched between the cover plate body and the electrode terminal for insulation and sealing, and the buffering structure is disposed between the pole cap portion and the insulation sealing member.

According to a third aspect of the present disclosure, a battery may be provided. The battery may comprise: a shell having at least an opening end; the cover assembly according to the second aspect of the present disclosure for sealing the opening end; and an electric core and an electrolyte which are received in a sealed space formed by the shell and the cover assembly, in which the electrode terminal is electrically connected with the electric core.

With the electrode terminal with the buffering structure according to an embodiment of the present disclosure, when the electrode terminal is welded with the insulation sealing member, large stress caused by differences of expansion coefficients between or among different members during welding may be reduced. In addition, the ceramic sealing member opt to break and crack may be protected during welding, thus enhancing the reliability of the battery.

Meanwhile, the battery comprising the ceramic sealed cover assembly has advantages of improved aging resistance and prolonged lifespan, thus enhancing the battery safety and performance accordingly. Moreover, the via hole comprises a mounting groove portion projecting from a surface of the cover plate body with an electrode receiving hole being formed in a bottom portion of the mounting groove portion and the terminal pole portion of the electrode terminal penetrating through the electrode receiving hole, thus further reducing the stress produced when the insulation sealing member is welded with the cover plate body. Generally, the electrode terminal and the cover assembly according to an embodiment of the present disclosure are easy to manufacture with simplified manufacturing process. In addition, and the battery yield and the battery stability may be increased, thus laying a sound foundation for practical application and development of a battery which is ceramic sealed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
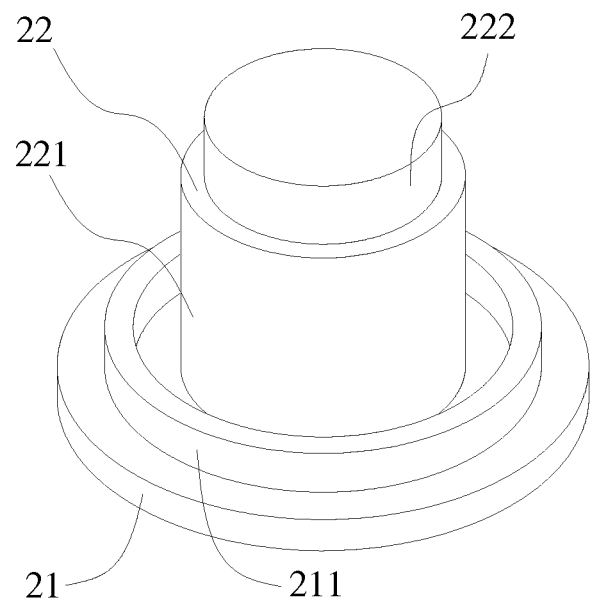
FIG. 1 is a perspective view of an electrode terminal according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description, unless specified or limited otherwise, it is to be understood that phraseology and terminology used herein with reference to device or element orientation, for example, terms like "upper", "lower", and the like, should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation.

The cover assembly according to an embodiment of the present disclosure is used for sealing a battery, and mainly used for sealing a lithium ion battery, especially a high-power lithium ion battery such as a lithium ion power battery or a lithium ion storage battery. As known to those skilled in the art that, the lithium ion battery mainly comprises a shell having at least an opening end, an electric core placed in the shell, and an electrolyte received in the shell. To avoid electrolyte leakage, a cover assembly is used to seal the opening end of the shell. The shell for receiving the electric core and the electrolyte may be made from aluminum or steel. There may be one opening end. For example, one end of the shell is opened for leading out a current from one end of the lithium ion battery. Alternatively, there may be two opening ends. For example, two ends of the shell are opened for leading out currents from two ends of the lithium ion battery respectively. It should be noted that, in the following, there are no limitations on the number and/or position of the opening end(s). The opening end may be formed at a short side of the shell, and the electric core is placed in the shell vertically. An end of the electric core for leading out a current is exposed from the opening end. In another embodiment, the opening end may also be formed at a long side of the shell, and the electric core is placed in the shell horizontally. A wound circular arc edge portion of the electric core may be exposed from the opening end. The electric core may be formed by stacking or winding a positive plate, a separator and a negative plate sequentially. The electric core and the process for preparing the same may be known in the art, and detail descriptions of those are not necessary.

The cover assembly according to an embodiment of the present disclosure will be described below in detail with reference to the accompanying drawings.

Figure 4:
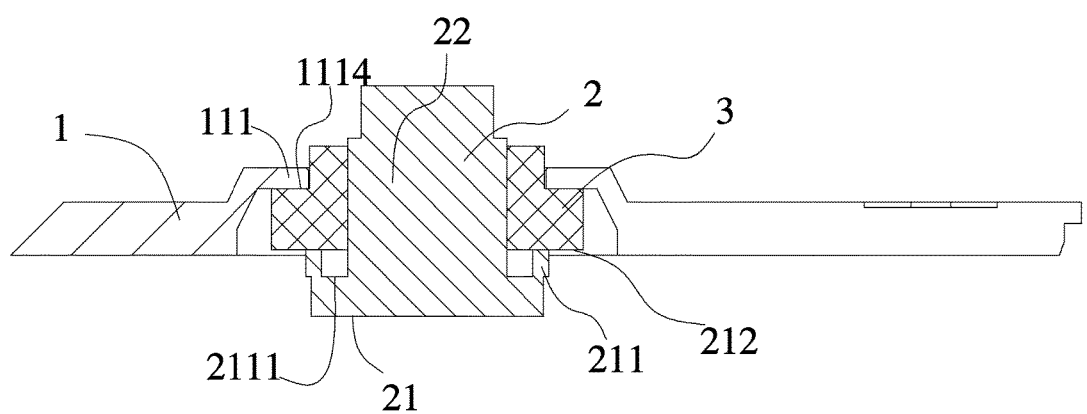
FIG. 4 is a schematic sectional view of a cover assembly according to an embodiment of the present disclosure.

As shown in FIG. 4, the cover assembly of the present disclosure comprises a cover plate body 1, an electrode terminal 2 and an insulation sealing member.

The electrode terminal 2 is electrically connected with the electric core (not shown) for leading out a current from the battery. There are no limitations on the number or shape of the electrode terminals 2, which may be determined according to the magnitude of the current to be led out. In one embodiment, the electrode terminal 2 may be a metal conductive member connected with a tab, which may be directly connected with the electric core to achieve electrical conduction between the electric core and the electrode terminal 2. Alternatively, the electrode terminal 2 may be connected with a connecting piece, and then the connecting piece is welded with the tab of the electric core to achieve electrical conduction between the electric core and the electrode terminal 2.

In one embodiment, the electrode terminal 2 comprises a terminal pole portion 22 and a pole cap portion 21 formed on an end of the terminal pole portion 22. The pole cap portion 21 and the terminal pole portion 22 may be integrally formed, and may also be connected with each other by welding or cold heading. Any suitable materials can be used to make the pole cap portion 21 and the terminal pole portion 22. For example, for a positive electrode terminal, the materials of the pole cap portion 21 and the terminal pole portion 22 may be pure aluminum, an aluminum alloy, or other materials; and for a negative electrode terminal, the materials of the pole cap portion 21 and the terminal pole portion 22 may be pure copper, or other materials.

Figure 2:
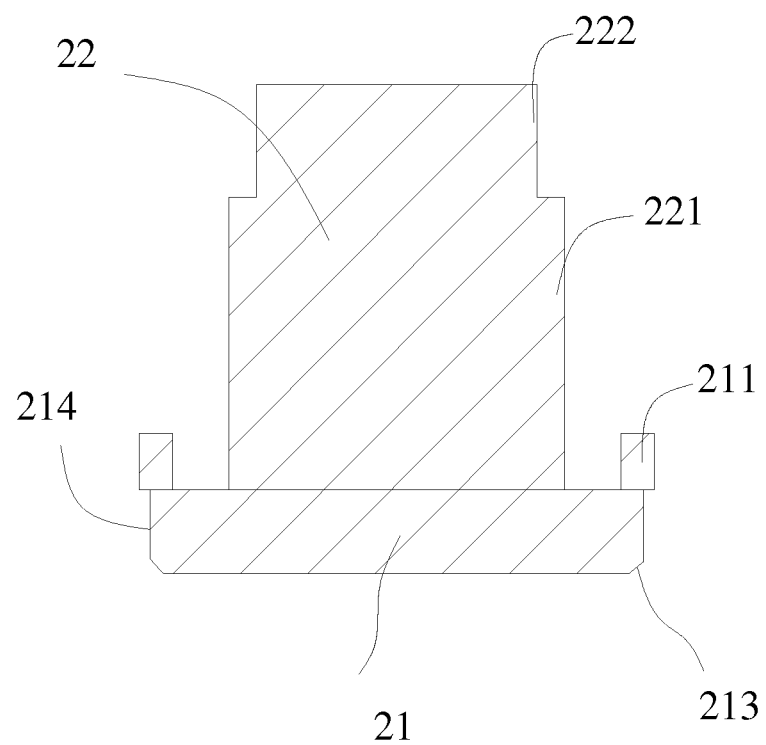
FIG. 2 is a sectional view of an electrode terminal according to an embodiment of the present disclosure.
Figure 3:
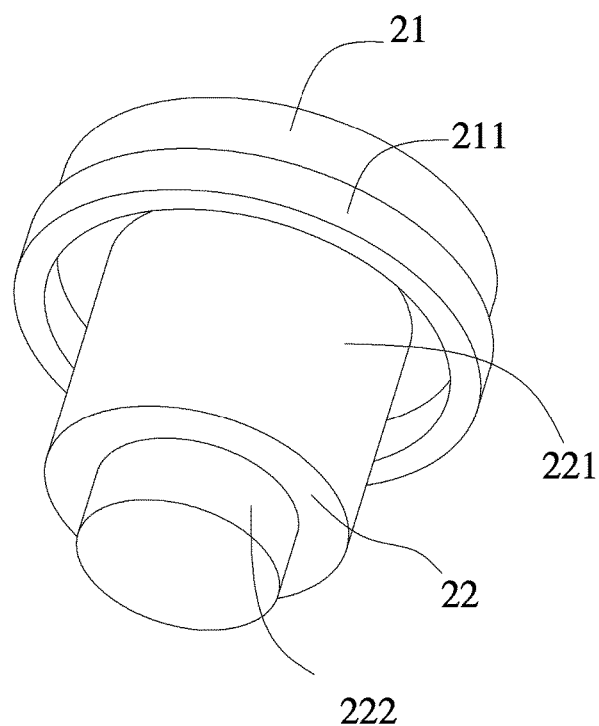
FIG. 3 is a perspective view of an electrode terminal according to another embodiment of the present disclosure.

The pole cap portion 21 and the terminal pole portion 22 can use many different shapes. The pole cap portion 21 and the terminal pole portion 22 are connected with each other. In one embodiment, the pole cap portion 21 and the terminal pole portion 22 are connected with each other in a vertical direction. For example, a rectangular sheet-like pole cap portion 21 and a rectangular sheet-like terminal pole portion 22 perpendicular to each other are connected with each other. The pole cap portion 21 and the terminal pole portion 22 may be assembled as required. As shown in FIG. 2, in one embodiment, the electrode terminal 2 may have an inverted "T" shape. In the following, a cylindrical terminal pole portion 22 will be described as an example for illustration purpose. In one embodiment, the terminal pole portion 22 may have a diameter of about 6.0±0.05 mm. The size of other members in the cover assembly, for example, the size of a via hole 11, an electrode receiving hole 1111 and a central hole 33, may be determined according to the diameter of the terminal pole portion 22. In one embodiment, the shape of the pole cap portion 21 is adapted to that of the cylindrical terminal pole portion 22, and the pole cap portion 21 is projected as a circle in a plane perpendicular to an axis of the pole cap portion 21. For example, in one embodiment, the pole cap portion 21 may be a cylinder, which has a height larger than about one-fourth the height of the terminal pole portion 22 and smaller than about half the height of the terminal pole portion 22. Particularly, the pole cap portion 21 may have a height of about 2.5±0.05 mm and an outer diameter of about 8.8±0.03 mm, as shown in FIGS. 2-3. In another embodiment, the pole cap portion 21 may be a thin circular metal sheet, which may have a thickness of about 0.8 mm and an outer diameter larger than that of the terminal pole portion 22, as shown in FIG. 1.

In one embodiment, a buffering structure 211 is disposed on a surface 212 of the pole cap portion 21 facing the terminal cap portion 22. In one embodiment, the buffering structure 211 may be formed on an inner surface 2111 of the pole cap portion 21 as shown in FIGS. 1-3, for reducing the stress produced between different materials when the electrode terminal 2 is welded to the insulation sealing member and reducing the influence of the welding on the cover assembly. In some embodiments, the buffering structure 211 may include a support damping member disposed between the pole cap portion 21 and the insulation sealing member. For example, the support damping member may be a boss integrally formed with the pole cap portion 21 at the inner surface 2111. Alternatively, the support damping member may be an annular metal member with the buffering effect integrally formed with the inner surface 2111 of the pole cap portion 21, and the annular metal member may be sheet-like. In one embodiment, the buffering structure 211 may be configured as a support damping ring formed at the periphery of the surface of the pole cap portion 21. For example, the buffering structure 211 may include an annular support damping boss formed on the inner surface 2111 of the pole cap portion 21. The support damping ring 211 may be an annular ring, a square ring, a hexahedral ring. The outer diameter of the annular support boss may be larger or smaller than the outer diameter of the pole cap portion 21. In one embodiment, the inner diameter of the support damping ring 211 may be larger than or equal to the outer diameter of the pole cap portion 21, and a connecting part is disposed between the pole cap portion 21 and the support damping ring 211. In another embodiment, the outer diameter of the support damping ring 211 may be smaller than the outer diameter of the pole cap portion 21; and the annular support boss may be joined with the terminal pole portion 22 on the inner surface 2111 of the pole cap portion 21. The annular support boss may be coated on a part of the surface of the terminal pole portion 22, or alternatively the annular support boss may not be joined with the terminal pole portion 22 and may have an inner diameter larger than the outer diameter of the terminal pole portion 22 so as to form a gap between the annular support boss and the terminal pole portion 22.

The thickness of the support damping ring 211 may be from about one-third to about three-fourth the thickness of a corresponding insulation sealing member to be clamped between the electrical terminal 2 and the cover plate body 1. The height of the annular support boss may be from about one-fourth to about half of the height of a corresponding insulation sealing member. In one embodiment, for the pole cap portion 21 with an outer diameter of about 8.8±0.03 mm, an annular support boss with a height of about 1.0±0.05 mm, an outer diameter of about 9.2±0.05 mm, an inner diameter of about 8.2±0.05 mm and a thickness of about 1.0±0.05 mm may be formed on the inner surface 2111 of the pole cap portion 21, and the annular support boss may be spaced apart from an edge of the lower surface of the pole cap portion 21 by a distance of about 0.8±0.05 mm. The buffering structure 211 and the pole cap portion 21 may be integrally formed when the pole cap portion 21 is made. Alternatively, the pole cap portion 21 may be formed first, and then the buffering structure 211 is welded on the lower surface of the pole cap portion 21.

The pole cap portion 21 may be further mechanically processed. For example, the pole cap portion 21 may have an external peripheral surface 214. A first chamfer 213 may be formed at a periphery of the external peripheral surface 214, as shown in FIG. 2. The pole cap portion 21 may be connected with an external load or an electrode connecting piece. The pole cap portion 21 may be easily fit into a mounting hole of the electrode connecting piece for welding, and if a soldering process is performed, the solder may be concentrated at a soldering joint and prevented from dispersing.

In one embodiment, the terminal pole portion 22 comprises a first pole part 221 connected with the pole cap portion 21, and a second pole part 222 connected with the first pole part 221 and having an outer diameter smaller than that of the first pole part 221 for engaging with a metal conductor. In one embodiment, the first pole part 221 penetrates through the central hole 33 of the ceramic sealing member 3 and extends out of the ceramic sealing member 3 together with the second pole part 222 for leading out a current. The second pole part 222 is used as an output terminal of an electrode of the battery, and may be connected with an external load by laser welding, resistance welding, or other welding processes.

Figure 5:
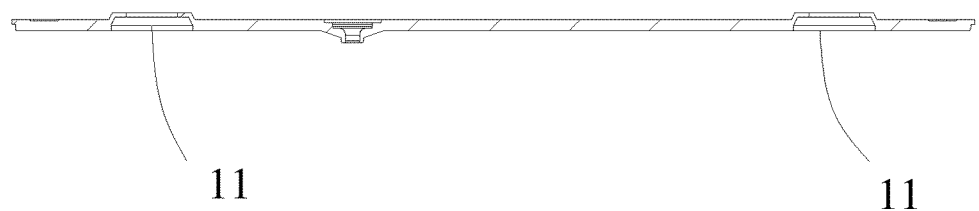
FIG. 5 is a sectional view of a cover plate body according to an embodiment of the present disclosure.

The cover plate body 1 is used for sealing the shell of the battery. As shown in FIG. 5, the cover plate body 1 is formed with a via hole 11 penetrating through the cover plate body 1 for leading out a current from the battery. There are no limitations on the number of the via hole 11, which may be determined according to the number of the electrode terminals 3 for leading out the current. For example, when the current is led out from one end of the battery, the cover plate body 1 may be formed with one via hole 11, through which an electrode terminal 2 with one polarity penetrates. In this embodiment, an electrode terminal 2 with the opposite polarity, for example, may be connected with the shell for leading out a current, and the electrode terminal 2 penetrating through the cover plate body 1 is subjected to insulation treatment. The cover plate body 1 may also be formed with a plurality of via holes 11, through which electrode terminals 3 with the same polarity or opposite polarities penetrate respectively. When electrode terminals 3 with different polarities penetrate through the plurality of via holes 11 respectively, only the electrode terminals 3 with one polarity may be subjected to insulation treatment, or the electrode terminals 3 and the cover plate body 1 are all subjected to insulation treatment.

The via hole 11 may be of any suitable shape. For example, the via hole 11 may be of a cylindrical shape, which penetrates through the cover plate body 1 and has a diameter slightly larger than the outer diameter of the electrode terminal 2. In one embodiment, the diameter of the via hole 11 may be smaller than the outer diameter of the pole cap portion 21, and the via hole 11 may be engaged with the pole cap portion 21. In another embodiment, the diameter of the via hole 11 may be larger than the outer diameter of the pole cap portion 21, and the pole cap portion 21 may be entirely or partially disposed in the via hole 11.

Figure 6:
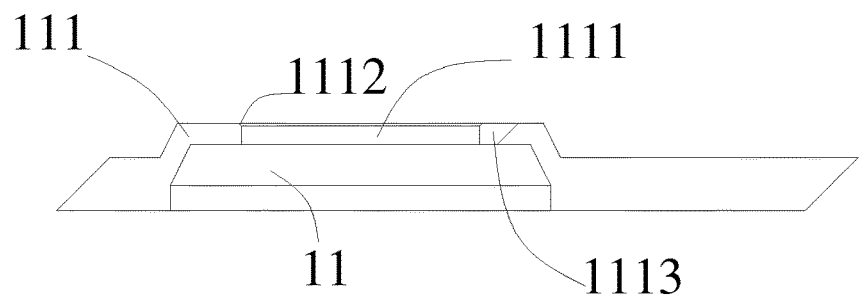
FIG. 6 is an enlarged sectional view of a via hole in a cover plate body according to an embodiment of the present disclosure.
Figure 8:
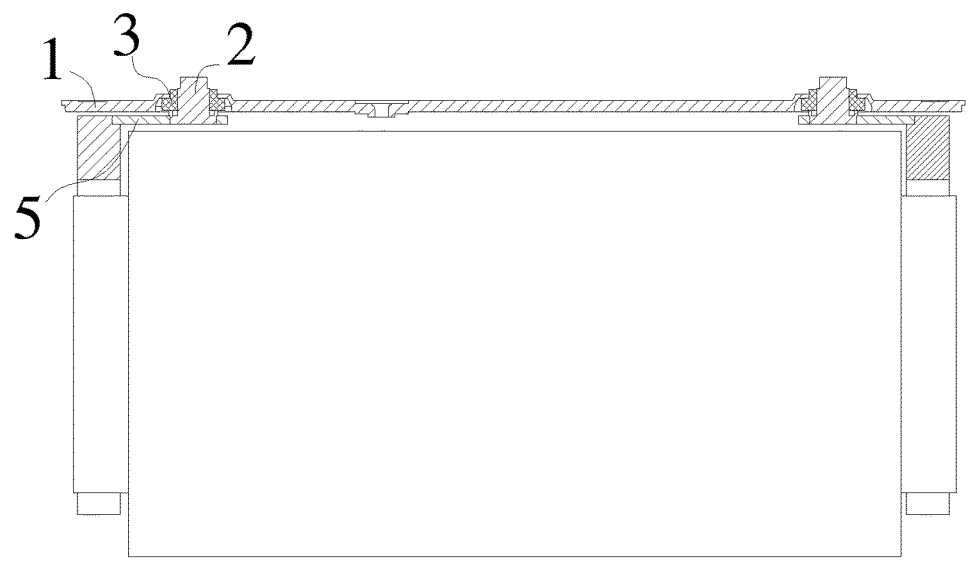
FIG. 8 is a sectional view of a battery according to an embodiment of the present disclosure.

As shown in FIG. 6, in one embodiment, the via hole 11 includes a mounting groove portion 111 projecting from a surface of the cover plate body 1. The surface of the cover plate body 1 may be an upper surface of the cover plate body 1 exposed from the battery or a lower surface of the cover plate body 1 facing inside of the battery, which may be determined according to the mounting relationship of the electrode terminal 2. For example, when the pole cap portion 21 of the electrode terminal 2 is disposed outside the battery shell for connecting with an external load and the second pole part 222 is disposed inside the battery shell for connecting with the electric core, the mounting groove portion 111 may be disposed inside the shell. In this embodiment, the mounting groove portion 111 projects from the lower surface of the cover plate body 1. Alternatively, when the second pole part 222 is disposed outside the battery shell for connecting with an external load, as shown in FIG. 8, and the pole cap portion 21 of the electrode terminal 2 is disposed inside the shell of the battery for connecting with the electric core, the mounting groove portion 111 may be projected externally. In this embodiment, the mounting groove portion 111 projects from the upper surface of the cover plate body 1. As shown in FIG. 4, the mounting groove portion 111 projects from the upper surface of the cover plate body 1 exposed from the battery. The mounting groove portion 111 and the cover plate body 1 may be integrally formed. Alternatively, the cover plate body 1 may be formed first, and then the mounting groove portion 111 is welded with the cover plate body 1. In one embodiment, there is a smooth transition portion, such as a circular arc transition portion, in the mounting groove portion 111; and there is another smooth transition portion connected between the mounting groove portion 111 and the cover plate body 1, thus ensuring the buffering and reduction of the mechanical stress in time during assembly. Furthermore, the flexural strength of the cover assembly is increased. In one embodiment, an electrode receiving hole 1111 is formed in a bottom portion 1113 of the mounting groove portion 111, and the terminal pole portion 22 of the electrode terminal 2 penetrates through the electrode receiving hole 1111 for leading out a current. There are no limitations on the number of the electrode receiving holes 1111. For example, the number of the electrode receiving holes 1111 may be determined according to the number of the electrode terminals 2. In one embodiment, the cover plate body 1 may be formed with one large via hole 11 and only one large mounting groove portion 111 is projected at the large via hole 11. The electrode receiving holes 1111 corresponding to the electrode terminals 2 are formed in the bottom portion 1113 of the mounting groove portion 111. Each electrode terminal 2 penetrates through one corresponding electrode receiving hole 1111 for leading out current, and an insulation sealing member is sandwiched between the mounting groove portion 111 and the electrode terminal 2. Alternatively, the number of the mounting groove portions 111 may also be determined according to the number of the electrode terminals 2. Only one electrode receiving hole 1111 may be formed in the bottom portion 1113 of the mounting groove portion 111. Or alternatively the number of the electrode receiving holes 1111 in each of bottom portions 1113 of the plurality of the mounting groove portions 111 may be different from each other. As shown in FIG. 6, in one embodiment, a second chamfer 1112 is formed at the periphery of the electrode receiving hole 1111, so that the ceramic sealing member 3 and the electrode terminal 2 may penetrate into or out of the electrode receiving hole 1111 conveniently.

The number of the cover plate bodies 1 may be determined according to the number of the opening ends of the shell. The shape of the cover plate body 1 may be designed according to the shape of the opening end of the shell. For example, the cover plate body 1 may have a circular or square shape. The cover plate body 1 may have a thickness of, for example, about 2.0 mm. The material of the cover plate body 1 may be selected, for example, from pure aluminum, an aluminum alloy, and other suitable materials. Other structures on the cover plate body 1, for example, a liquid injecting port, and the manufacturing methods thereof may be easily achieved in the art, so a detailed description thereof will be omitted here for clarity purpose.

Figure 7:
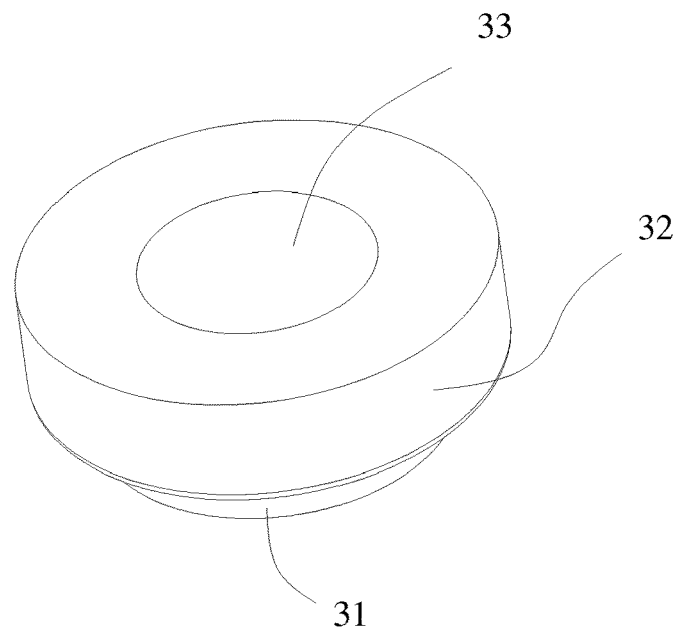
FIG. 7 is a perspective view of a ceramic sealing member according to an embodiment of the present disclosure.

In one embodiment, an insulation sealing member 4 is fixedly received in the via hole 11, and sandwiched between cover plate body 1 and the electrode terminal 2 for insulation and sealing. The buffering structure is disposed between the pole cap portion 21 and the insulation sealing member 4. In one embodiment, the insulation sealing member may be an injection molded member. As shown in FIG. 7, in one embodiment, the insulation sealing member may be a ceramic sealing member 3. A central hole 33 is formed at the center of the ceramic sealing member 3, the terminal pole portion 22 of the electrode terminal 2 penetrates through the central hole 33, and the ceramic sealing member 3 is sandwiched between the terminal pole portion 22 and the cover plate body 1. In one embodiment, the inner diameter of the central hole 33 in the ceramic sealing member 3 is configured to be mated with the outer diameter of the terminal pole portion 22 of the electrode terminal 2. The inner diameter of the central hole 33 in the ceramic sealing member 3 may be slightly larger than the outer diameter of the terminal pole portion 22, to allow a gap to be formed between the central hole 33 and the terminal pole portion 22, so as to avoid the expansion of the ceramic sealing member 3 when heated. The inner diameter of the central hole 33 in the ceramic sealing member 3 may be smaller than the outer diameter of the pole cap portion 21, thus ensuring that the terminal pole portion 22 penetrates through the central hole 33 and the pole cap portion 21 is connected with the ceramic sealing member 3 and ensuring good sealing performance between the ceramic sealing member 3 and the electrode terminal 2.

The ceramic sealing member 3 includes a sealing portion 31 penetrating through the via hole 11, and a connecting portion 32 having an outer diameter larger than that of the sealing portion 31 and connected with the buffering structure 211 and the cover plate body 1 respectively. For the cover plate body 1 with a via hole 11, the sealing portion 31 penetrates through the via hole 11 and is sandwiched between the terminal pole portion 22 and the cover plate body 1, and the connecting portion 32 is sandwiched between the buffering structure 211 and the cover plate body 1. In one embodiment, the via hole 11 includes a mounting groove portion 111 projecting from a surface of the cover plate body 1. An electrode receiving hole 1111 is formed in the bottom portion 1113 of the mounting groove portion 111. The ceramic sealing member 3 includes the sealing portion 31, which penetrates through the electrode receiving hole 1111 and the connecting portion 32, which has an outer diameter larger than that of the sealing portion 31 and is connected with the buffering structure 211 and the cover plate body 1 respectively. The connecting portion 32 is disposed in the mounting groove portion 111. That is, the connecting portion 32 is positioned inside the mounting groove portion 111, thus facilitating the welding and ensuring stable connection of the cover assembly. The connecting portion 32 may be completely disposed in the via hole 11. In this embodiment, the height of the connecting portion 32 is smaller than the thickness of the cover plate body 1 where the via hole 11 is formed. Alternatively, the connecting portion 32 may be partially disposed in the via hole 11. In this embodiment, the height of the connecting portion 32 is larger than the thickness of the cover plate body 1 where the via hole 11 is formed. Alternatively, the height of the connecting portion 32 is equal to the thickness of the cover plate body 1. In one embodiment, the aperture diameter of the via hole 11 is larger than or equal to the outer diameter of the connecting portion 32, the aperture diameter of the electrode receiving hole 1111 is configured to be mated with the outer diameter of the sealing portion 31 and is smaller than the outer diameter of the connecting portion 32, so that the cover assembly may have good sealing performance. The step of connecting the connecting portion 32 with the bottom portion 1113 of the mounting groove portion 111 may be performed by any process for connecting ceramic with metal known in the art, for example, a process that uses a metal soldering flux. For example, a first metal welding layer (not shown) is disposed between the connecting portion 32 and an inner surface of the bottom portion 1113 of the mounting groove portion 111. In some embodiments, the first metal welding layer may be formed by surface-metallizing the connecting portion 32 and welding the connecting portion 32 with the inner surface of the bottom portion of the mounting groove portion 111 by soldering. The metallizing step may be performed by commonly used ceramic surface metallizing processes in the art, for example, Mn—Mo surface metallizing. In one embodiment, after the ceramic metallizing, nickel, zinc, aluminum and other elements, which do not affect the welding may be further plated, so as to enhance the mechanical strength at the welding joint. In one embodiment, a transition metal ring is further disposed between the connecting portion 32 and the inner surface 1114 of the bottom portion 1113 of the mounting groove portion 111. The transition metal ring may be used to buffer or reduce the mechanical stress produced during the soldering process. The transition metal ring may be made of various metal materials, which may be easily welded with aluminum or an aluminum alloy. The largest outer diameter of the transition metal ring may be identical with or different from the outer diameter of the connecting portion 32 of the ceramic sealing member 3. The soldering process is commonly used in the art, so a detailed description thereof will be omitted here. By the soldering process, a substrate to be welded may be integrally connected at the welding joint. The mounting groove portion 111 and the ceramic sealing member 3 are welded into an integral structure. On one hand, the sealing strength may be ensured; on the other hand, the interfacial difference of materials may be reduced, thus reducing the internal resistance of the cover assembly as well as the heat generated by the battery.

The step of connecting the buffering structure 211 with the external end surface of the connecting portion 32 may be performed by any process for connecting ceramic with metal known in the art, for example, a process that uses a metal soldering flux. For example, a second metal welding layer (not shown) may be disposed between the buffering structure 211 and the external end surface 212 of the connecting portion 32. In some embodiments, the second metal welding layer may be formed by metallizing the external end surface 212 of the connecting portion 32 and welding the metallized external end surface 212 of the connecting portion 32 with the buffering structure 211 by soldering. The metallizing step may be performed by commonly used ceramic surface metallizing processes in the art, for example, Mn—Mo surface metallizing. In one embodiment, after the ceramic metallizing, nickel, zinc, aluminum and other elements which do not affect the welding may be further plated, so as to enhance the mechanical strength at the welding joint. In one embodiment, a transition metal ring is further disposed between the buffering structure 211 and the external end surface 212 of the connecting portion 32. The transition metal ring may be used to buffer or reduce the mechanical stress produced during the soldering process. The transition metal ring (not shown) may be made of various metal materials, which may be easily welded with copper, a copper alloy, aluminum or an aluminum alloy. For example, the transition metal ring may be made of Kovar alloy, copper, a copper alloy, aluminum or an aluminum alloy. The largest outer diameter of the transition metal ring may be identical with or different from the outer diameter of the connecting portion 32 of the ceramic sealing member 3. In one embodiment, nickel, zinc, aluminum and other elements which do not affect the welding may be further plated on a surface of the transition metal ring to enhance the mechanical strength at the welding joint. The soldering process is commonly used in the art, so a detailed description thereof will be omitted here. By the soldering process, a substrate to be welded may be integrally connected at the welding joint. The pole cap portion 21 of the electrode terminal 2 and the ceramic sealing member 3 are welded into an integral structure. On one hand, the sealing strength may be ensured; on the other hand, the interfacial difference of materials may be reduced, thus reducing the internal resistance of the cover assembly as well as the heat generated by the battery.

In some embodiments, the ceramic sealing member 3 may be one of an aluminum oxide ceramic ring, a zirconium oxide ceramic ring, an aluminum nitride ceramic ring, a boron nitride ceramic ring, a silicon nitride ceramic ring, and a composite ceramic ring of aluminum oxide and zirconium oxide. In one embodiment, the ceramic sealing member 3 may be an aluminum oxide ceramic ring or a composite ceramic ring of aluminum oxide and zirconium oxide, and the central hole 33 in the ceramic sealing member 3 has an aperture diameter of about Ø6.0±0.1 mm and a thickness of about 2.5±0.1 mm. The ceramic sealing member 3 has good corrosion resistance without being corroded by the electrolyte, thus ensuring the service life of the lithium ion battery. The impact strength and the thermal shock resistance of the ceramic sealing member 3 may be superior to those of a glass sealing member, so that the structure of the cover assembly may be more stable and the sealing effect may be improved. When the ceramic sealing member 3, rather than a ceramic plate, is used as a sealing and connection medium, the ceramic sealing member 3 has a larger thickness, thus improving the thermal shock resistance and the thermal cycling performance of the lithium ion battery.

In one embodiment, the cover assembly may further comprise an electrode connecting piece 5. The electrode terminal 2 is electrically connected with the electric core via the electrode connecting piece 5 for leading out a current. The electrode connecting piece 5 is formed with a mounting hole for mounting the electrode terminal 2. There are no limitations on the size and position of the mounting hole, which may be determined according to the electrode terminal 2 to be mounted. The mounting of the electrode terminal 2 may be achieved by welding a portion of the second pole part 222 of the electrode terminal 2, which is extended into the mounting hole and out of the ceramic sealing member 3, or alternatively may be achieved by welding a portion of the pole cap portion 21 of the electrode terminal 2 into the mounting hole, as shown in FIG. 8. In one embodiment, the second pole part 222 is mounted in the mounting hole. In another embodiment, the pole cap portion 21 is mounted in the mounting hole. The mounting hole may or may not penetrate through the electrode connecting piece 5, which may be determined according to the portion of the electrode terminal 2 to be connected. In order to prevent electrical short circuit, insulation treatment may be performed between the cover plate body 1 and the electrode connecting piece 5. For example, a sealing ring (not shown) may be provided between the cover plate body 1 and the electrode connecting piece 5. In this embodiment, particularly, an O-ring may be fitted over a lower end of the ceramic sealing member 3. The sealing ring may be made of a material which is not soluble in the electrolyte, for example, a PP (polypropylene) or PE (polyethylene) plastic.

The method of manufacturing the cover assembly according to an embodiment of the present disclosure comprises the following steps.

The connecting portion 32 of the ceramic sealing member 3 is surface-metallized (Step S1).

Then, the terminal pole portion 22 of the electrode terminal 2 is fitted in the central hole 33 of the ceramic sealing member 3, an end of the terminal pole portion 22 extends out of the central hole 33, and the pole cap portion 21 of the electrode terminal 2 is welded with the external end surface 212 of the connecting portion 32 of the ceramic sealing member 3 (Step S2).

In this step, the metal pole cap portion 21 is welded with the connecting portion 32 of the ceramic sealing member 3 by a soldering or fusion-cast process. For the soldering process, a soldering flux needs to be used at a temperature not lower than a melting point of a parent metal to perform the welding. For the fusion-cast process, only the parent metal needs to be melted to achieve the connection between the metal and the ceramic. The step and parameters of the fusion-cast process are known in the art. In some embodiments, a solder used in the soldering process may be one for welding a ceramic with aluminum, for example, an Al—Si alloy, an Al—Mg alloy, or an Al—Si—Mg alloy. In one embodiment, the solder used in the soldering process may be an Al—Si alloy, in which the content of Si is in a range from 0 to about 12 wt %, preferably, in a range from 5 wt % to about 8 wt %, and the balance is Al. The soldering process is performed at a temperature of about 570° C. to about 625° C. under vacuum or an inert gas atmosphere. In one embodiment, the inert gas atmosphere may be a nitrogen atmosphere or a mixed gas atmosphere of nitrogen and hydrogen. After the soldering, a soldering flux layer is formed between the pole cap portion 21 and the connecting portion 32, that is, the pole cap portion 21 is connected with the connecting portion 32 via the soldering flux layer. In one embodiment, the fusion-cast process may be performed at a temperature of about 600° C. to about 1300° C. under vacuum or an inert gas atmosphere.

An integral structure of the electrode terminal 2 and the ceramic sealing member 3 is placed in the via hole 11 of the cover plate body 1, the terminal pole portion 22 of the electrode terminal 2 and the sealing portion 31 of the ceramic sealing member 3 penetrate through the electrode receiving hole 1111 in the bottom portion 1113 of the mounting groove portion 111, and then the connecting portion 32 is welded with the inner surface of the bottom portion of the mounting groove portion 111 to make the cover assembly into an integral structure (Step S3). The welding step may be performed by physical welding processes. For example, the physical welding processes may include resistance welding, laser welding or ultrasonic welding, for achieving the welding between different metals. The steps and parameters of the resistance welding, laser welding or ultrasonic welding process are known in the art, so a detailed description thereof will be omitted here.

The pole cap portion 21 of the electrode terminal 2 on the lower surface of the cover plate body 1 is fitted in and welded with the mounting hole of the electrode connecting piece 5. The welding step may be performed by physical welding processes. For example, the physical welding processes may be resistance welding, laser welding or ultrasonic welding, for achieving the welding between different metals. The steps and parameters of the resistance welding, laser welding or ultrasonic welding process are known in the art, so a detailed description thereof will be omitted here.

In the above method, one cover plate body 1 may be formed with one electrode terminal 2, and may also be formed with a plurality of electrode terminals 2 with different polarities. The sequence of the steps of the above manufacturing method may be adjusted according to the mounting mode and the welding temperature. When the electrode terminal is a negative electrode terminal, the cover assembly may be manufactured directly in accordance with the above steps. When the electrode terminal is a positive electrode terminal, the steps S2 and S3 may be recombined, that is, the electrode terminal 2, the ceramic sealing member 3 and the cover plate body 1 are assembled according to the positional relationship thereof and then welded together. For example, when there are positive and negative electrode terminals, the ceramic sealing member 3 and an electrode terminal 2 with one polarity, for example, a negative electrode terminal, are first made into an integral structure in accordance with the steps S1 and S2, and then the integral structure and the cover plate body 1 is assembled. Then, the surface of the ceramic sealing member is metallized in accordance with the step S1, and the ceramic sealing member 3, the cover plate body 1 and an electrode terminal 2 with the opposite polarity, for example, a positive electrode terminal, are assembled. Then, the positive electrode terminal and the negative electrode terminal are welded in accordance with the step S3 respectively. Finally, subsequent steps are carried out accordingly.

According to an embodiment of the present disclosure, a battery is provided. The battery comprises: a shell having at least an opening end, the cover assembly described above for sealing the opening end, and an electric core and an electrolyte which are received in a sealed space formed by the shell and the cover assembly, in which the electrode terminal is electrically connected with the electric core. In the following, further embodiments of the battery, such as a lithium ion battery, will be illustrated for the better understanding of the gist and essence of the present disclosure.

In one embodiment, when the shell has an opening end, the electric core is placed in the shell, the electrolyte is injected into the shell, and then the cover assembly formed with two electrode terminals 2 is mounted onto the opening end of the shell. In this process, the periphery of the cover assembly is welded with the shell, and the electrode connecting piece of the cover assembly is connected with the electric core. Particularly, a positive plate of the electric core is connected with the electrode connecting piece on one electrode terminal via a positive tab, and a negative plate of the electric core is connected with the electrode connecting piece on the other electrode terminal via a negative tab. After the assembling, a sealed space is formed between the cover assembly and the shell, and the electric core and the electrolyte are received in the sealed space. The two electrode terminals are used as two electrodes of the lithium ion battery respectively, and may be connected with external electrical apparatuses respectively.

In one embodiment, the shell may have two opening ends and may be formed with two cover assemblies, one cover assembly is formed with a positive electrode terminal, and the other cover assembly is formed with a negative electrode terminal. At this time, two cover assemblies are mounted onto the two opening ends of the shell respectively. In this process, the second pole parts of the two cover assemblies are welded with the shell respectively, and the electrode connecting pieces of the two cover assemblies are connected with the electric core respectively. Particularly, a positive plate of the electric core is connected with the second pole part of the cover assembly formed with the positive electrode terminal via a positive tab, and a negative plate of the electric core is connected with the second pole part of the cover assembly formed with the negative electrode terminal via a negative tab. After the assembling, a sealed space is formed among the two cover assemblies and the shell, and the electric core and the electrolyte are received in the sealed space. The terminal pole portions of the two cover assemblies are used as two electrodes of the lithium ion battery respectively, and may be connected with external electrical apparatuses respectively.

With the electrode terminal having the buffering structure according to an embodiment of the present disclosure, when the electrode terminal is welded with the insulation sealing member, stress produced by different expansion coefficients may be reduced, the influence of the large stress on the cover assembly may be weakened, especially problems that the ceramic sealing member is easy to break and crack caused when different materials with large difference are welded may be solved, thus enhancing the reliability of the battery.

Meanwhile, the battery comprising the ceramic sealed cover assembly has advantages of improved aging resistance and prolonged lifespan, thus enhancing the battery safety and performance accordingly. Moreover, the via hole comprises a mounting groove portion projecting from a surface of the cover plate body with an electrode receiving hole being formed in a bottom portion of the mounting groove portion and the terminal pole portion of the electrode terminal penetrating through the electrode receiving hole, thus further reducing the stress produced when the insulation sealing member is welded with the cover plate body. Generally, the electrode terminal and the cover assembly according to an embodiment of the present disclosure are easy to manufacture with simplified manufacturing process. In addition, and the battery yield and the battery stability may be increased, thus laying a sound foundation for practical application and development of a battery which is ceramic sealed.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. An electrode terminal, the electrode terminal being a part of a cover assembly, comprising:
   a terminal pole portion including a first end and a second end opposite to the first end;
   a sealing member including a central hole;
   a pole cap portion integrally formed on the second end of the terminal pole portion and having a first surface facing the terminal portion; and
   a buffering structure that protrudes from the first surface of the pole cap portion to be in contact with the sealing member and physically separates the first surface of the pole cap portion from the sealing member such that the first surface is spaced apart from the sealing member, the buffering structure being spaced apart from the terminal pole portion,
   wherein the terminal pole portion penetrates through the sealing member such that the terminal pole portion is in contact with the sealing member.

2. The electrode terminal according to claim 1, wherein the buffering structure and the pole cap portion are integrally formed.

3. The electrode terminal according to claim 1, wherein the buffering structure includes a support damping ring formed on the surface of the pole cap portion.

4. The electrode terminal according to claim 3, wherein an inner diameter of the support damping ring is equal to or larger than an outer diameter of the pole cap portion.

5. The electrode terminal according to claim 3, wherein an outer diameter of the support damping ring is smaller than an outer diameter of the pole cap portion.

6. The electrode terminal according to claim 1, wherein the pole cap portion is a cylinder which has a height larger than about one-fourth the height of the terminal pole portion and smaller than about half the height of the terminal pole portion.

7. The electrode terminal according to claim 6, wherein a first chamfer is formed at a periphery of an external peripheral surface of the pole cap portion.

8. The electrode terminal according to claim 1, wherein the terminal pole portion comprises:
   a first pole part in contact with the pole cap portion; and
   a second pole part fixedly connected with the first pole part and having an outer diameter smaller than that of the first pole part.

9. The electrode terminal of claim 1, wherein a surface of the protruding portion of the buffering structure is welded to a surface of the sealing member.

* * * * *

UNITED STATES PATENT AND TRADEMARK OFFICE
CERTIFICATE OF CORRECTION

PATENT NO. : 10,109,839 B2  
APPLICATION NO. : 14/134984  
DATED : October 23, 2018  
INVENTOR(S) : Qisi Deng et al.

Page 1 of 1

It is certified that error appears in the above-identified patent and that said Letters Patent is hereby corrected as shown below:

On the Title Page

Item (30), in the Foreign Application Priority Data:  
"Jun. 28, 2011   (CN).........................2011 1 0175937" should read  
--Jun. 28, 2011   (CN).........................201110175937.9--  
"Apr. 20, 2012   (CN).........................2012 1 0117704" should read  
--Apr. 20, 2012   (CN).........................201210117704.8--

Signed and Sealed this  
Twenty-second Day of January, 2019

Andrei Iancu  
*Director of the United States Patent and Trademark Office*